(12) United States Patent
Feng

(10) Patent No.: US 11,228,916 B2
(45) Date of Patent: Jan. 18, 2022

(54) METHOD AND DEVICE FOR TRANSMITTING UPLINK INFORMATION ON UNLICENSED CARRIER

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 44 days.

(21) Appl. No.: 15/774,504

(22) PCT Filed: Feb. 4, 2016

(86) PCT No.: PCT/CN2016/073430
§ 371 (c)(1),
(2) Date: May 8, 2018

(87) PCT Pub. No.: WO2017/132927
PCT Pub. Date: Aug. 10, 2017

(65) Prior Publication Data
US 2020/0015090 A1    Jan. 9, 2020

(51) Int. Cl.
*H04W 16/14* (2009.01)
*H04L 5/00* (2006.01)
*H04W 72/04* (2009.01)

(52) U.S. Cl.
CPC ............ *H04W 16/14* (2013.01); *H04L 5/0055* (2013.01); *H04W 72/0406* (2013.01); *H04W 72/0446* (2013.01)

(58) Field of Classification Search
CPC ............ H04L 5/0055; H04L 1/18–1864; H04L 1/16–1692; H04W 16/14;
(Continued)

(56) References Cited

U.S. PATENT DOCUMENTS

2003/0135640 A1* 7/2003 Ho .................. H04L 1/1621
709/237
2007/0153760 A1* 7/2007 Shapira ............ H04W 56/0005
370/350
(Continued)

FOREIGN PATENT DOCUMENTS

CN       104301273 A       1/2015
CN       104333873 A       2/2015
(Continued)

OTHER PUBLICATIONS

English translation of the Written Opinion of the International Search Authority in the international application No. PCT/CN2016/073430, dated Nov. 8, 2016.
(Continued)

*Primary Examiner* — Dung B Huynh
(74) *Attorney, Agent, or Firm* — Ladas & Parry, LLP

(57) ABSTRACT

The invention discloses a method and a device for transmitting uplink information on an unlicensed carrier, and implementing uplink information transmission on the unlicensed carrier. The method comprises: a terminal device determines a current time resource set for performing data transmission on an unlicensed carrier with respect to network equipment, wherein the network equipment uses a time resource set obtained by means of competition to perform data transmission on an unlicensed carrier, each time resource set comprises continuously distributed time resources, and time resources in different time resource sets are separated by an interval; and the terminal device transmits, to the network equipment, on the unlicensed carrier using a first time resource in the current time resource set, the uplink information, wherein the uplink information corresponds to downlink information transmitted by the
(Continued)

network equipment using at least one previous time resource set in the current time resource set.

16 Claims, 3 Drawing Sheets

(58) Field of Classification Search
CPC ......... H04W 72/0406; H04W 72/0446; H04W 74/002; H04W 74/0808
See application file for complete search history.

(56) References Cited

U.S. PATENT DOCUMENTS

| | | | |
|---|---|---|---|
| 2010/0165939 A1* | 7/2010 | Lin | H04L 1/1854 370/329 |
| 2010/0211845 A1* | 8/2010 | Lee | H04L 1/1812 714/749 |
| 2010/0271999 A1* | 10/2010 | Yu | H04W 74/004 370/312 |
| 2011/0053625 A1* | 3/2011 | Ishii | H04L 1/1887 455/507 |
| 2011/0096710 A1* | 4/2011 | Liu | H04L 1/1628 370/312 |
| 2011/0170495 A1* | 7/2011 | Earnshaw | H04L 5/001 370/329 |
| 2012/0155413 A1* | 6/2012 | Liu | H04L 1/1861 370/329 |
| 2013/0163553 A1* | 6/2013 | Lee | H04L 1/0027 370/329 |
| 2013/0294356 A1* | 11/2013 | Bala | H04W 16/14 370/329 |
| 2014/0003387 A1* | 1/2014 | Lee | H04L 5/001 370/330 |
| 2014/0036889 A1* | 2/2014 | Kim | H04L 1/1854 370/336 |
| 2014/0086112 A1* | 3/2014 | Stern-Berkowitz | H04L 1/1854 370/280 |
| 2014/0112219 A1* | 4/2014 | Li | H04L 1/1893 370/280 |
| 2014/0177491 A1* | 6/2014 | Hao | H04L 1/1864 370/280 |
| 2014/0341018 A1* | 11/2014 | Bhushan | H04W 56/002 370/230 |
| 2014/0378157 A1* | 12/2014 | Wei | H04W 16/14 455/454 |
| 2015/0049708 A1* | 2/2015 | Damnjanovic | H04L 1/1812 370/329 |
| 2015/0049709 A1* | 2/2015 | Damnjanovic | H04L 5/0055 370/329 |
| 2015/0296385 A1* | 10/2015 | Zhang | H04W 72/1263 370/329 |
| 2015/0341921 A1* | 11/2015 | Chen | H04W 74/004 370/330 |
| 2015/0365931 A1* | 12/2015 | Ng | H04L 1/1812 370/329 |
| 2016/0057770 A1* | 2/2016 | Yerramalli | H04W 52/54 370/329 |
| 2016/0095134 A1* | 3/2016 | Chen | H04L 1/1861 370/336 |
| 2016/0128089 A1* | 5/2016 | Seo | H04B 7/26 370/329 |
| 2016/0183249 A1* | 6/2016 | Lei | H04L 5/001 370/336 |
| 2016/0204924 A1* | 7/2016 | Li | H04L 5/0053 370/280 |
| 2016/0261379 A1* | 9/2016 | Bergstrom | H04W 72/042 |
| 2016/0261383 A1* | 9/2016 | Bergstrom | H04W 72/042 |
| 2016/0262188 A1* | 9/2016 | Zhang | H04J 11/0056 |
| 2016/0278118 A1* | 9/2016 | Yerramalli | H04W 72/0453 |
| 2016/0302225 A1* | 10/2016 | Damnjanovic | H04W 74/06 |
| 2016/0338107 A1* | 11/2016 | Zeng | H04W 16/14 |
| 2016/0353474 A1* | 12/2016 | Zhang | H04L 1/1812 |
| 2016/0366594 A1* | 12/2016 | Chang | H04W 16/14 |
| 2017/0064657 A1* | 3/2017 | Chendamarai Kannan | H04W 56/0015 |
| 2017/0079033 A1* | 3/2017 | Lin | H04W 74/04 |
| 2017/0215172 A1* | 7/2017 | Yang | H04W 72/0413 |
| 2017/0215179 A1* | 7/2017 | Choi | H04L 1/0026 |
| 2017/0272955 A1* | 9/2017 | Sadek | H04W 16/14 |
| 2017/0272957 A1* | 9/2017 | Xu | H04W 76/20 |
| 2017/0295499 A1* | 10/2017 | Guo | H04W 16/14 |
| 2017/0311349 A1* | 10/2017 | Zhang | H04W 74/0808 |
| 2017/0339717 A1* | 11/2017 | Futaki | H04W 16/14 |
| 2018/0048498 A1* | 2/2018 | Stern-Berkowitz | H04L 27/0006 |
| 2018/0124749 A1* | 5/2018 | Park | H04W 74/08 |
| 2018/0175973 A1* | 6/2018 | Rosa | H04L 1/1812 |
| 2018/0220447 A1* | 8/2018 | Kim | H04W 16/14 |
| 2018/0270860 A1* | 9/2018 | Bhorkar | H04W 72/0406 |
| 2018/0310235 A1* | 10/2018 | You | H04W 8/00 |
| 2018/0359772 A1* | 12/2018 | Park | H04W 16/14 |

FOREIGN PATENT DOCUMENTS

| | | |
|---|---|---|
| CN | 104540230 A | 4/2015 |
| CN | 104735729 A | 6/2015 |
| EP | 3104650 A1 | 12/2016 |
| WO | 2007007380 A1 | 1/2007 |
| WO | 2015043243 A1 | 4/2015 |
| WO | 2015127669 A | 9/2015 |
| WO | 2015131730 A | 9/2015 |
| WO | 2015169397 A | 11/2015 |
| WO | 2015179055 A1 | 11/2015 |

OTHER PUBLICATIONS

Supplementary European Search Report in the European application No. 16888752.9, dated Apr. 5, 2019.
Huawei et al: "Frame structure for LAA DL and UL transmission operation" 3GPP Draft: R1-152470, 3rd Generation Partnership Project (3GPP), Mobile Competence Centre ; 650, Route Des Lucioles : F-06921 Sophia-Antipolis Cedex : Francevol. RAN WG1, No. Fukuoka, Japan; May 25, 2015-May 29, 2015 May 24, 2015 (May 24, 2015), XP050970908, Retrieved from the Internet: URL:http://www.3gpp.org/ftp/Meetings 3GPP SYNC/RAN1/Docs/ [retrieved on May 24, 2015] * the whole document *.
Ericsson: "On UCI Design for LAA", 3GPP Draft: R1-151134. 3rd Generation Partnership Project (3GPP), Mobile Competence Centre ; 650, Route Des Lucioles: F-06921 Sophia-Antipolis Cedex ; Francevol. RAN WG1, No. Paris, France; Mar. 24, 2015-Mar. 26, 2015 Mar. 18, 2015 (Mar. 18, 2015), XP050951459, Retrieved from the Internet: URL:http://www.3gpp.org/ftp/tsg_ran/ WG1 RL 1/TSGR1 AH/LTE LAA 1503/Docs/ [retrieved on Mar. 18, 2015] age 1, line 7-p. 7, line 21.
ZTE: "UL framework for LAA" 3GPP Draft; R1-154048, 3rd Generation Partnership Project (3GPP). Mobile Competence Centre; 650, Route Des Lucioles F-06921 Sophia-Antipolis Cedex Francevol. RAN WG1, No. Beijing, China; Aug. 24, 2015-Aug. 28, 2015 Aug. 15, 2015 (Aug. 15, 2015), XP050994123, Retrieved from the Internet: URL:http://www.3gpp.org/ftp/tsg_ran/WG1 RL 1/TSGR1 82/Docs/[retrieved on Aug. 15, 2015] * p. 1, line 7-p. 6, line 24 *.
NTT Docomo et al: Discussion on channel access framework for potential LAA UL 3GPP Draft: R1-157220 Discussion on UL Channel Access Final, 3rd Generation Partnership Project (3GPP), Mobile Competence Centre ; 650, Route Des Lucioles F-06921 Sophia-Antipolis Cedex ; Francevol. RAN WG1, No. Anaheim, USA; Nov. 15, 2015 Nov. 22, 2015 Nov. 15, 2015 (Nov. 15, 2015), XP051003444Retrieved from the Internet:URL:http://www.3gpp. org/ftp/Meetings 3GPPSYNC/RAN1/Docs/[retrieved on Nov. 15, 2015].
Intel Corporation, Comparison of evaluation results for various UL LB T options, 3GPP TSG-RAN WG1#81 R1-153439, 3GPP, Jun. 1, 2015.
ZTE, UL framework for LAA, 3GPP TSG-RAN WG1#82b R1-155245, 3GPP, Sep. 26, 2015.

(56) References Cited

OTHER PUBLICATIONS

InterDigital Communications, On Scheduling and HARQ operation for LAA, 3GPP TSG-RAN WG1#81 R1-153144, 3GPP, May 15, 2015.
Huawei, HiSilicon, Power control for eCA, 3GPP TSG-RAN WG1#83 R1-156920, 3GPP, Nov. 7, 2015.
First Office Action of the Japanese application No. 2018-526585, dated Aug. 13, 2019.
International Search Report in international application No. PCT/CN2016/073430, dated Nov. 8, 2016.
Written Opinion of the International Search Authority in international application No. PCT/CN2016/073430, dated Nov. 8, 2016.
"HARQ operation for large transport block sizes"; 3GPP TSG-RAN WG1 #86-BIS R1-1609744 Lisbon, Portugal, Oct. 10-14, 2016.
"New Work Item on enhanced LAA for LTE"; 3GPP TSG RAN Meeting #70 RP-152272 Sitges, Spain, Dec. 7-10, 2015.
First Office Action of the European application No. 16888752.9, dated Mar. 12, 2020.
Office Action of the Indian application No. 201817018781, dated Apr. 23, 2020.
First Office Action of the Taiwanese application No. 106103400, dated Aug. 25, 2020.
First Office Action of the Japanese application No. 2019-238530, dated Oct. 9, 2020.
Second Office Action of the Japanese application No. 2019-238530, dated Apr. 23, 2021.
Supplementary European Search Report in the European application No. 21164944.7, dated Jun. 17, 2021.
ZTE, "UL framework for LAA", 3GPP TSG RAN WG1 Meeting #83 R1-156994, Anaheim, USA, Nov. 15-22, 2015.
Decision of Refusal of the Japanese application No. 2019-238530, dated Nov. 16, 2021.

* cited by examiner

METHOD AND DEVICE FOR TRANSMITTING UPLINK INFORMATION ON UNLICENSED CARRIER

RELATED APPLICATION

This application is an application under 35 U.S.C. 371 of International Application No. PCT/CN2016/073430 filed on Feb. 4, 2016, the entire contents of which are incorporated herein by reference.

TECHNICAL FIELD

Embodiments of the disclosure relate to the field of communications, and more particularly to a method and device for transmitting uplink information on an unlicensed carrier.

BACKGROUND

At present, it is considered to use unlicensed frequency bands (for example, 2.4 GHz and 5.8 GHz) in a wireless cellular system to extend frequency of use in the cellular system, and the methods mainly include a License Assisted Access (LAA) technology. LAA mainly has the following characteristics: an unlicensed frequency band is required to be aggregated with a licensed frequency band for use, and the unlicensed frequency band can only work as a secondary carrier; and use of the unlicensed frequency band is not only limited to scheduling of a base station but also limited to a load of the frequency band, and namely, may be used only through a contention mechanism. Before a sending end device transmits data on an unlicensed carrier, the sending end device is required to perform Listen Before Talk (LBT) detection on the unlicensed carrier, and may transmit the data on the unlicensed carrier only after determining that a channel is in an idle state. In addition, time for which the sending end device occupies the transmission channel of the unlicensed carrier every time should not exceed a maximum occupation duration. Therefore, the sending end device is required to release the channel after occupying the channel for a certain period and contend for a channel resource again when being required to use the channel.

At present, there is yet no solution for transmitting uplink information on an unlicensed frequency band. If terminal equipment executes LBT before sending uplink information on an unlicensed carrier, since different terminal equipment is at different locations in a cell and their detection results about the same unlicensed carrier may be greatly different, time for transmitting the uplink information by the terminal equipment in a system is greatly different. In addition, network equipment (for example, a base station) is required to maintain a time sequence relationship (for example, Acknowledgement (ACK)/Non-Acknowledgement (NACK) feedback information) of the uplink information for different terminal equipment respectively, which is complex in implementation.

SUMMARY

The embodiments of the disclosure provide a method and device for transmitting uplink information on an unlicensed carrier, which may implement transmission of the uplink information on the unlicensed carrier.

A first aspect provides a method for transmitting uplink information on an unlicensed carrier, which may include that: terminal equipment determines a present time resource set for data transmission of network equipment on the unlicensed carrier, wherein the network equipment may perform data transmission on the unlicensed carrier through time resource sets obtained by contention, time resources included in each time resource set may be continuously distributed, and the time resources in different time resource sets may be distributed at intervals; and the terminal equipment sends the uplink information to the network equipment in a first time resource of the present time resource set on the unlicensed carrier, the uplink information corresponding to downlink information transmitted by the network equipment in at least one previous time resource set of the present time resource set.

Specifically, the time resource sets obtained by the network equipment by contention include the present time resource set and the at least one previous time resource set, and any time resource in the at least one previous time resource set is located before any time resource in the present time resource set.

Therefore, according to the method for transmitting the uplink information on the unlicensed carrier in the embodiments of the disclosure, the network equipment contends for transmission resources on the unlicensed carrier, and the terminal equipment transmits the uplink information in the present time resource set, obtained by the network equipment by contention, of the unlicensed carrier, the uplink information corresponding to the downlink information transmitted by the network equipment in the at least one previous time resource set, and the terminal equipment may transmit the uplink information without contending for the transmission resources on the unlicensed carrier.

In combination with the first aspect, in a first possible implementation mode of the first aspect, the downlink information may include Downlink Control Information (DCI), and the uplink information may include a Physical Uplink Shared Channel (PUSCH); or the downlink information may include a Physical Downlink Shared Channel (PDSCH), and the uplink information may include an ACK/NACK.

In combination with the abovementioned possible implementation mode, in a second possible implementation mode of the first aspect, the operation that the terminal equipment determines the present time resource set for data transmission of the network equipment on the unlicensed carrier may include that: the terminal equipment receives first information sent by the network equipment; and the terminal equipment determines a set number of the present time resource set obtained by the network equipment by contention according to the first information.

In combination with the abovementioned possible implementation modes, in a third possible implementation mode of the first aspect, the first information may include System Frame Number (SFN) information of a system frame where a starting time resource in the present time resource set is located, or the first information may include set number information of the present time resource set.

In combination with the abovementioned possible implementation modes, in a fourth possible implementation mode of the first aspect, before the operation that the terminal equipment sends the uplink information to the network equipment in the first time resource of the present time resource set on the unlicensed carrier, the method may further include that: the terminal equipment receives second information sent by the network equipment in the present time resource set, the second information indicating that the present time resource set or the first time resource is configured for transmission of the uplink information corresponding to the downlink information transmitted by the network equipment in the at least one previous time resource set; or the terminal equipment receives third information sent by the network equipment in the at least one previous time resource set, the third information indicating that the uplink information corresponding to the downlink information transmitted by the network equipment in the at least one previous time resource set is transmitted in the present time resource set or the first time resource; or the terminal equipment determines according to a preset rule that the present time resource set or the first time resource is configured for transmission of the uplink information corresponding to the downlink information transmitted by the network equipment in the at least one previous time resource set.

In combination with the abovementioned possible implementation modes, in a fifth possible implementation mode of the first aspect, the third information may include the set number information of the present time resource set.

In combination with the abovementioned possible implementation modes, in a sixth possible implementation mode of the first aspect, the second information may include set number information of each of the at least one previous time resource set.

In combination with the abovementioned possible implementation modes, in a seventh possible implementation mode of the first aspect, the second information may further include time resource number information of at least one target time resource unit in the at least one previous time resource set, wherein the first time resource may be configured for transmission of the uplink information corresponding to the downlink information transmitted by the network equipment on the at least one target time resource unit.

Optionally, a time resource unit is specifically a subframe, and the second information further includes subframe number information of at least one target subframe in the at least one previous time resource set. In this case, the first time resource may specifically correspond to the at least one target subframe.

In combination with the abovementioned possible implementation modes, in an eighth possible implementation mode of the first aspect, before the operation that the terminal equipment sends the uplink information to the network equipment in the first time resource of the present time resource set on the unlicensed carrier, the method may further include that: the terminal equipment determines the first time resource in the present time resource set according to a preset rule; or the terminal equipment receives fourth information sent by the network equipment in the present time resource set, the fourth information being configured to indicate the first time resource.

In combination with the abovementioned possible implementation modes, in a ninth possible implementation mode of the first aspect, the downlink information may include the PDSCH, and the uplink information may include the ACK/NACK; and the operation that the terminal equipment sends the uplink information to the network equipment in the first time resource of the present time resource set on the unlicensed carrier may include that: the terminal equipment sends an N-bit ACK/NACK to the network equipment through a Physical Uplink Control Channel (PUCCH) or PUSCH on the first time resource, the N-bit ACK/NACK being configured to indicate whether the terminal equipment successfully receives the PDSCH sent to the terminal equipment by the network equipment in the at least one previous time resource set.

In combination with the abovementioned possible implementation modes, in a tenth possible implementation mode of the first aspect, the operation that the terminal equipment sends the N-bit ACK/NACK to the network equipment through the PUCCH or PUSCH on the first time resource may include that: the terminal equipment sends the N-bit ACK/NACK to the network equipment on the first time resource by adopting PUCCH format 3 or PUCCH format 4 or PUCCH format 5.

In combination with the abovementioned possible implementation modes, in an eleventh possible implementation mode of the first aspect, N may be determined by the following formula:

$$N = \sum_{i=0}^{K-1} C \cdot X_i,$$

where K may represent a number of the at least one previous time resource set, C may represent a maximum bit number of the ACK/NACK corresponding to each PDSCH, $X_i$ may be equal to a number of time resource units included in an ith previous time resource set in the at least one previous time resource set or equal to a number of downlink time resource units included in the ith previous time resource set or equal to a parameter value configured for the ith previous time resource set by the network equipment, and the parameter value may not be greater than the number of the time resource units included in the ith previous time resource set.

In combination with the abovementioned possible implementation modes, in a twelfth possible implementation mode of the first aspect, N may be determined by the following formula:

$$N = \sum_{i=0}^{K-1} Y_i,$$

where K may represent the number of the at least one previous time resource set, $Y_i$ may be equal to the parameter value configured for the ith previous time resource set in the at least one previous time resource set by the network equipment, and the parameter value may be an integer more than or equal to 0.

A second aspect provides another method for transmitting uplink information on an unlicensed carrier, which may include that: network equipment determines a present time resource set for data transmission on the unlicensed carrier, wherein the network equipment may perform data transmission on the unlicensed carrier through time resource sets obtained by contention, time resources included in each time resource set may be continuously distributed, and the time resources in different time resource sets may be distributed at intervals; and the network equipment receives the uplink information sent by terminal equipment in a first time resource of the present time resource set on the unlicensed carrier, the uplink information corresponding to downlink information transmitted by the network equipment in at least one previous time resource set.

Specifically, the time resource sets obtained by the network equipment by contention include the present time resource set and the at least one previous time resource set, and any time resource in the at least one previous time resource set is located before any time resource in the present time resource set.

In combination with the second aspect, in a first possible implementation mode of the second aspect, the downlink information may include DCI, and the uplink information may include a PUSCH; or the downlink information may include a PDSCH, and the uplink information may include an ACK/NACK.

In combination with the abovementioned possible implementation mode, in a second possible implementation mode of the second aspect, before the operation that the network equipment receives the uplink information sent by the terminal equipment in the first time resource of the present time resource set on the unlicensed carrier, the method may further include that: the network equipment sends first information, the first information being configured to indicate a set number of the present time resource set.

In combination with the abovementioned possible implementation mode, in a third possible implementation mode of the second aspect, the first information may include SFN information of a system frame where a starting time resource in the present time resource set is located, or the first information may include set number information of the present time resource set.

In combination with the abovementioned possible implementation modes, in a fourth possible implementation mode of the second aspect, before the operation that the network equipment receives the uplink information sent by the terminal equipment in the first time resource of the present time resource set on the unlicensed carrier, the method may further include that: the network equipment sends second information in the present time resource set, the second information indicating that the present time resource set or the first time resource is configured for transmission of the uplink information corresponding to the downlink information transmitted by the network equipment in the at least one previous time resource set; or the network equipment sends third information in the at least one previous time resource set, the third information indicating that the uplink information corresponding to the downlink information transmitted by the network equipment in the at least one previous time resource set is transmitted in the present time resource set or the first time resource; or the network equipment determines that the present time resource set or the first time resource is configured for transmission of the uplink information corresponding to the downlink information transmitted in the at least one previous time resource set according to a preset rule.

In combination with the abovementioned possible implementation modes, in a fifth possible implementation mode of the second aspect, the third information may include the set number information of the present time resource set.

In combination with the abovementioned possible implementation modes, in a sixth possible implementation mode of the second aspect, the second information may include set number information of each of the at least one previous time resource set.

In combination with the abovementioned possible implementation modes, in a seventh possible implementation mode of the second aspect, the second information may further include time resource number information of at least one target time resource unit in the at least one previous time resource set, wherein the first time resource may be configured for transmission of the uplink information corresponding to the downlink information transmitted by the network equipment on the at least one target time resource unit.

In combination with the abovementioned possible implementation modes, in an eighth possible implementation mode of the second aspect, before the operation that the network equipment receives the uplink information sent by the terminal equipment in the first time resource of the present time resource set on the unlicensed carrier, the method may further include that: the network equipment sends fourth information in the present time resource set, the fourth information being configured to indicate the first time resource.

In combination with the abovementioned possible implementation modes, in a ninth possible implementation mode of the second aspect, the downlink information may include the PDSCH, and the uplink information may include the ACK/NACK; and the operation that the network equipment receives the uplink information sent by the terminal equipment in the first time resource of the present time resource set on the unlicensed carrier may include that: the network equipment receives an N-bit ACK/NACK transmitted by the terminal equipment through a PUCCH or PUSCH on the first time resource, the N-bit ACK/NACK being configured to indicate whether the terminal equipment successfully receives the PDSCH sent to the terminal equipment by the network equipment in the at least one previous time resource set.

In combination with the abovementioned possible implementation modes, in a tenth possible implementation mode of the second aspect, the operation that the network equipment receives the N-bit ACK/NACK transmitted by the terminal equipment through the PUCCH or PUSCH on the first time resource may include that: the network equipment receives the N-bit ACK/NACK transmitted by the terminal equipment on the first time resource by adopting PUCCH format 3 or PUCCH format 4 or PUCCH format 5.

In combination with the abovementioned possible implementation modes, in an eleventh possible implementation mode of the second aspect, N may be determined by the following formula:

$$N = \sum_{i=0}^{K-1} C \cdot X_i,$$

where K may represent a number of the at least one previous time resource set, C may represent a maximum bit number of the ACK/NACK corresponding to each PDSCH, $X_i$ may be equal to a number of time resource units included in an ith previous time resource set of the at least one previous time resource set or equal to a number of downlink time resource units included in the ith time resource set or equal to a parameter value configured for the ith time resource set by the network equipment, and the parameter value may not be larger than the number of the time resource units included in the ith time resource set.

In combination with the abovementioned possible implementation modes, in a twelfth possible implementation mode of the second aspect, N may be determined by the following formula:

$$N = \sum_{i=0}^{K-1} Y_i,$$

where K may represent the number of the at least one previous time resource set, $Y_i$ may be equal to the parameter value configured for the ith time resource set in the at least one previous time resource set by the network equipment, and the parameter value may be an integer more than or equal to 0.

A third aspect provides a device for transmitting uplink information on an unlicensed carrier, which is configured to execute the method in the first aspect or any possible implementation mode of the first aspect. Specifically, the device includes units configured to execute the method in the first aspect or any possible implementation mode of the first aspect.

A fourth aspect provides another device for transmitting uplink information on an unlicensed carrier, which is configured to execute the method in the second aspect or any possible implementation mode of the second aspect. Specifically, the device includes units configured to execute the method in the second aspect or any possible implementation mode of the second aspect.

A fifth aspect provides another device for transmitting uplink information on an unlicensed carrier, which includes a memory and a processor, the memory is configured to store instructions, the processor is configured to execute the instructions stored in the memory, and when the processor executes the instructions stored in the memory, such execution causes the processor to execute the method in the first aspect or any possible implementation mode of the first aspect.

A sixth aspect provides another device for transmitting uplink information on an unlicensed carrier, which includes a memory and a processor, the memory is configured to store instructions, the processor is configured to execute the instructions stored in the memory, and when the processor executes the instruction stored in the memory, such execution causes the processor to execute the method in the second aspect or any possible implementation mode of the second aspect.

A seventh aspect provides a computer-readable medium, which is configured to store a computer program, the computer program including instructions configured for the execution of the method in the first aspect or any possible implementation mode of the first aspect.

An eighth aspect provides a computer-readable medium, which is configured to store a computer program, the computer program including instructions configured for the execution of the method in the second aspect or any possible implementation mode of the second aspect.

Optionally, in some aspects of the disclosure, the network equipment sends at least one of the following information in a broadcast form: the first information, the second information, the third information or the fourth information.

In such a manner, the network equipment may configure all terminal equipment to adopt the same uplink and downlink subframe correspondence or Hybrid Automatic Repeat reQuest (HARQ) correspondence without the need of determining an uplink and downlink correspondence according to a respective condition of each piece of terminal equipment, so that complexity of the network equipment is reduced, and system performance is improved.

BRIEF DESCRIPTION OF DRAWINGS

In order to describe the technical solutions of the embodiments of the disclosure more clearly, the drawings required to be used in the descriptions about the embodiments of the disclosure or a related art will be simply introduced below. Obviously, the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work shall fall within the scope of protection of the disclosure.

It should be understood that the technical solutions of the embodiments of the disclosure may be applied to various communication systems, for example: a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system and the like.

In addition, terms "system" and "network" in the disclosure may usually be exchanged for use in the disclosure. Term "and/or" in the disclosure is only an association relationship for describing associated objects, and represents that there may exist three relationships. For example, A and/or B may represent the three conditions that: A exists independently, A and B both exist, and B exists independently. Moreover, the character "/" in the disclosure usually represents that the associated objects form an "or" relationship.

Figure 1:
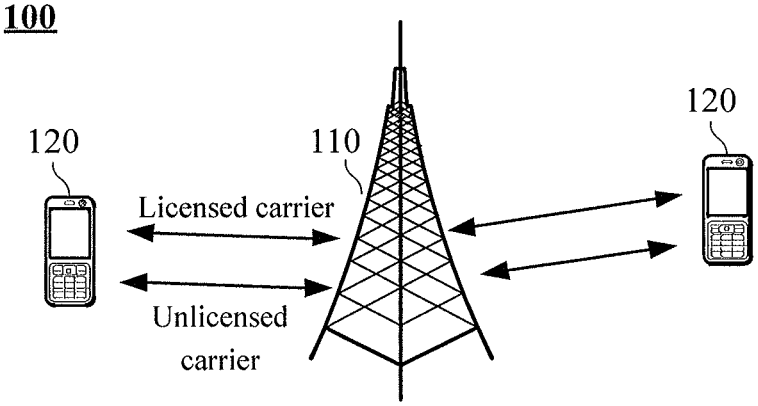
FIG. 1 is a schematic diagram of a system architecture applied in the embodiments of the disclosure.

FIG. 1 illustrates a wireless communication system 100 applied in the embodiments of the disclosure. The wireless communication system 100 may include at least one piece of network equipment 110. The network equipment 110 may be equipment communicating with terminal equipment. Each piece of network equipment 100 may provide communication coverage for a specific geographical region, and may communicate with terminal equipment in the coverage. The network equipment 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network equipment may be a relay station, an access point, vehicle-mounted equipment, wearable equipment, network-side equipment in a future 5th-Generation (5G) network, network equipment in a future evolved Public Land Mobile Network (PLMN) and the like.

The wireless communication system 100 further includes multiple pieces of terminal equipment 120 located within the coverage of the network equipment 110. The terminal equipment 120 may be mobile or fixed. The terminal equipment 120 may be an access terminal, User Equipment (UE), a user unit, a user station, a mobile radio station, a mobile station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment, terminal equipment in the future 5G network, terminal equipment in the future evolved PLMN and the like.

FIG. 1 exemplarily illustrates one piece of network equipment and two pieces of terminal equipment. Optionally, the wireless communication system 100 may include multiple pieces of network equipment and another amount of terminal equipment may be included in coverage of each piece of network equipment, which will not be limited in the embodiments of the disclosure.

Optionally, the wireless communication system 100 may further include another network entity such as a network controller and a mobility management entity, which will not be limited in the embodiments of the disclosure.

The wireless communication system 100 may support LAA. For example, the wireless communication system 100 is specifically a Licensed Assisted Access Using Long Term Evolution (LAA-LTE) or another communication system, which will not be limited in the embodiments of the disclosure. When the network equipment 110 and the terminal equipment 120 communicate in an LAA manner, not only a licensed spectrum but also an unlicensed spectrum may be adopted, wherein the unlicensed spectrum is integrated in the LAA manner into a cellular communication network (for example, LTE) that originally adopts only the licensed spectrum, and may serve as a secondary component carrier in a carrier aggregation scenario. The licensed spectrum may be used only after licensing. The unlicensed spectrum requires no licensing, and may be legally used by anyone. In this case, a carrier on the licensed spectrum is called as a licensed carrier, and a carrier on the unlicensed spectrum is called as an unlicensed carrier.

In an LAA-LTE system or another communication system supporting LAA, network equipment may schedule an unlicensed carrier under assistance of a licensed carrier, wherein an LBT mechanism may be adopted for access of the unlicensed carrier, which, however, may not form any limit to the embodiments of the disclosure. Optionally, before performing data transmission on the unlicensed carrier, the network equipment may contend with a node in a Wireless Local Area Network (WLAN) and/or another node adopting LAA in the cellular network for resources on the unlicensed carrier and perform data transmission by using the resources obtained by contention after successful contention.

For ease of description, continuous time resources on the unlicensed carrier which the network equipment obtains by contention every time may be determined as a time resource set. The time resource set may include at least one continuous subframe or include the at least one continuous subframe and part of time resources in a certain subframe (for example, at least one continuous symbol in a certain subframe), for example, including a subframe n to subframe in which are continuously distributed and at least one continuous symbol in a subframe m+1, which will not form any limit to the embodiments of the disclosure.

Each time resource set obtained by the network equipment by contention may include continuously distributed time resources, and the time resources included in different time resource sets may be distributed at intervals, wherein the intervals may be one or more subframes and may also be one or more symbols, which will not be limited in the embodiments of the disclosure.

The network equipment may perform data transmission in the time resource sets obtained by contention. For example, the network equipment may send downlink information, for example, signaling or a PDSCH, to the terminal equipment in the time resource sets and may also receive uplink information, for example, an uplink feedback or a PUSCH, sent by the terminal equipment in the time resource sets, which will not be limited in the embodiments of the disclosure.

Figure 2:
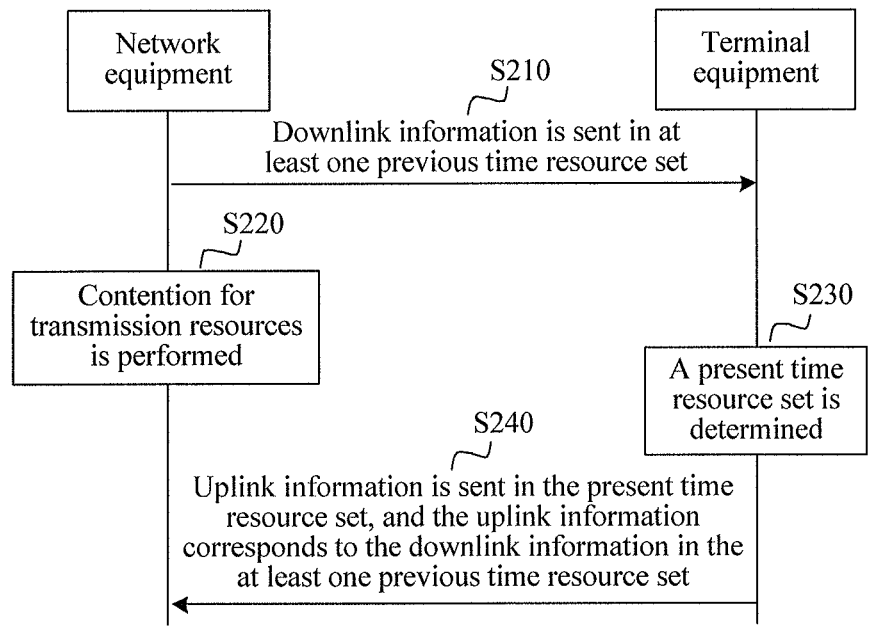
FIG. 2 is a schematic flowchart of a method for transmitting uplink information on an unlicensed carrier according to an embodiment of the disclosure.

FIG. 2 illustrates a method 200 for transmitting uplink information according to an embodiment of the disclosure. The method may be applied to transmission of the uplink information on an unlicensed carrier in LAA.

In S210, network equipment obtains at least one previous time resource set of an unlicensed carrier by contention, and sends downlink information to terminal equipment in the at least one previous time resource set.

Optionally, the network equipment may adopt an LBT mechanism to contend for a transmission channel of the unlicensed carrier. The network equipment obtains each of the at least one previous time resource set by contention, and may send the downlink information in the at least one previous time resource set. Optionally, the network equipment may further send the downlink information to other terminal equipment in the at least one previous time resource set.

In S220, the network equipment continues contending for transmission resources on the unlicensed carrier.

If the network equipment obtains the transmission resources on the unlicensed carrier by contention, a time resource set formed by continuous time resources, currently obtained by the network equipment by contention, on the unlicensed carrier may be called as a present time resource set.

In S230, terminal equipment determines a present time resource set for data transmission of the network equipment on the unlicensed carrier.

The terminal equipment may determine in multiple manners the time resource set currently obtained by the network equipment by contention, i.e., the present time resource set. Optionally, the network equipment may send information in the present time resource set, the information may include indication information or a PDSCH, and correspondingly, the terminal equipment may determine the present time resource set, obtained by the network equipment by contention, of the unlicensed carrier according to the information received in the present time resource set. For example, the network equipment may send the information in a starting time resource of the present time resource set, and may specifically send it to the terminal equipment in a broadcast form or a unicast form, which will not be limited in the embodiments of the disclosure.

As an alternative embodiment, the network equipment may send first information in the present time resource set, the first information being configured to indicate a set number of the present time resource set. Correspondingly, the terminal equipment may determine the set number of the present time resource set according to the first information, namely determining the number of the present time resource set in the time resource sets obtained by the network equipment by contention. The first information may explicitly or implicitly indicate the set number of the present time resource set. Optionally, the first information may include number information of a system frame where a starting time resource in the present time resource set is located. For example, the first information may include System Frame Number (SFN) information of a first subframe in the present time resource set. Alternatively, the first information may include set number information of the present time resource set. For example, time resource sets obtained by the network equipment by contention on the unlicensed carrier may be numbered according to a time sequence. However, this will not form any limit to the embodiments of the disclosure.

Optionally, the terminal equipment may further determine the continuous time resources included in the present time resource set according to the first information. For example, the network equipment may send the first information on a specific time resource (for example, the specific time resource may specifically be an Nth time resource unit in the present time resource set, and the time resource unit may be a subframe or a symbol or another unit) in the present time resource set, the specific time resource may be the starting time resource in the present time resource set, and correspondingly, the terminal equipment may determine the continuous time resources included in the present time resource set according to the specific time resource. However, this will not form any limit to the embodiments of the disclosure.

The network equipment may send the first information in the broadcast form and may also send the first information in the unicast or multicast manner, which will not be limited in the embodiments of the disclosure.

In S240, the terminal equipment sends uplink information to the network equipment on a first time resource of the unlicensed carrier, wherein the uplink information corresponds to the downlink information transmitted by the network equipment in the at least one previous time resource set.

Each time resource set in the at least one previous time resource set is located before the present time resource set, that is, any time resource in the at least one previous time resource set is located before any time resource in the present time resource set. The network equipment obtains the at least one previous time resource set of the unlicensed carrier by contention, and transmits the downlink information in each of the at least one previous time resource set, and the downlink information may include a PDSCH or downlink control signaling. The terminal equipment sends the uplink information corresponding to the downlink information in the at least one previous time resource set to the network equipment in the present time resource set. If the downlink information includes the PDSCH, the uplink information sent by the terminal equipment may include feedback information, for example, an ACK/NACK, configured to indicate whether the terminal equipment successfully receives the PDSCH. If the downlink information includes the downlink control signaling, for example, DCI, the uplink information sent by the terminal equipment may include a PUSCH scheduled by the downlink control signaling. If the downlink information includes a reference signal, for example, a Cell Reference Signal (CRS) or a Channel State Information Reference Signal (CSI-RS), the uplink information sent by the terminal equipment may include a measurement result for the reference signal by the terminal equipment, for example, Channel State Information (CSI). However, this will not form any limit to the embodiments of the disclosure.

Optionally, as another alternative embodiment, if the terminal equipment does not receive any downlink information sent by the network equipment in the at least one previous time resource set or does not receive any downlink information requiring uplink information to be sent in the at least one previous time resource set, the terminal equipment may send no uplink information to the network equipment in the present time resource set. However, this will not form any limit to the embodiments of the disclosure.

In the embodiment of the disclosure, the terminal equipment may determine the first time resource in multiple manners. Optionally, the first time resource may be determined according to a preset rule, and the preset rule may be specified by a protocol and preset in the terminal equipment, or may be configured by the network equipment in advance. For example, the first time resource may be an Mth time resource in the present time resource set, and the time resource unit may be a subframe or a symbol or another unit. Optionally, the network equipment may send the first information in the present time resource set, and the terminal equipment may determine the first time resource according to the first information and a preset interval between the time resource for sending the first information and the first time resource. For example, the first time resource and the time resource for sending the first information are adjacent or spaced by a fixed number of time resources, which will not be limited in the embodiments of the disclosure.

Optionally, as another embodiment, the terminal equipment may receive fourth information sent by the network equipment, the fourth information indicating the first time resource for transmitting the uplink information, and determine the first time resource according to the fourth information, wherein the fourth information may be sent by the network equipment in the present time resource set or sent by the network equipment in the at least one previous time resource set, which will not be limited in the embodiments of the disclosure. The fourth information may explicitly or implicitly indicate the first time resource. For example, the fourth information may include resource number information of the first time resource. For example, the first time resource may specifically be a first subframe and the fourth information includes time resource number information of the first subframe, which will not be limited in the embodiments of the disclosure.

In the embodiment of the disclosure, the terminal equipment may determine a corresponding relationship between the first time resource and the at least one previous time resource set in multiple manners. Optionally, the terminal equipment may determine the corresponding relationship according to a preset rule. For example, a corresponding relationship between the at least one previous time resource set and the present time resource set is predetermined or specified. For example, the at least one previous time resource set is one or more previous time resource sets of the present time resource set, and correspondingly, the terminal equipment may determine the corresponding relationship between the first time resource and the at least one previous time resource set according to the corresponding relationship between the present time resource set and the at least one previous time resource set and the first time resource for transmitting the uplink information in the present time resource set. For another example, the corresponding relationship between a time resource in the present time resource set and a previous time resource set is predetermined or specified. For example, an Lth time resource unit in the present time resource set has a correspondence with a Pth previous time resource set of the present time resource set, which, however, will not form any limit to the embodiments of the disclosure.

Optionally, as another embodiment, the terminal equipment may receive second information sent by the network equipment in the present time resource set or third information sent by the network equipment in the at least one previous time resource set. Correspondingly, the terminal equipment may determine the corresponding relationship between the first time resource and/or the present time resource set and the at least one previous time resource set according to the second information or the third information. Optionally, the second information may include at least one of: set number information of each of the at least one previous time resource set or number information of a system frame where a starting time resource of each of the at least one previous time resource set is located (for example, SFN information of a first subframe). The uplink information sent by the terminal equipment on the first time resource may correspond to part or all of the downlink information in each of the at least one previous time resource set. Optionally, the second information may further include time resource number information of at least one target time resource unit in the at least one previous time resource set, wherein the target time resource unit may specifically be a target subframe or another time resource unit, and in this case, the uplink information sent on the first time resource corresponds to the downlink information on the at least one target time resource unit. However, this will not form any limit to the embodiments of the disclosure.

Figure 3:
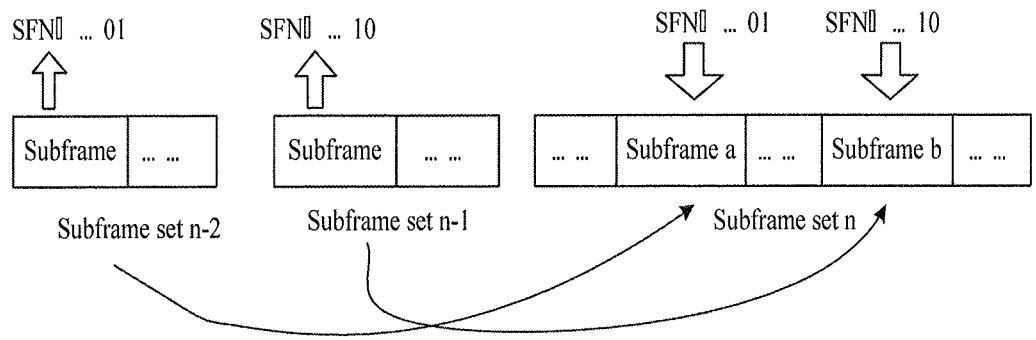
FIG. 3 is an example of a method for transmitting uplink information on an unlicensed carrier according to an embodiment of the disclosure.

Descriptions will be made below with the condition that a time resource set is specifically a subframe set and a time resource unit is specifically a subframe as an example. Assume that the present time resource set is specifically a subframe set n and the at least one previous time resource set includes a subframe set n−1 and a subframe set n−2. The first time resource includes a subframe a and a subframe b, wherein the subframe a corresponds to the subframe set n−2, the subframe b corresponds to the subframe set n−1, an SFN of a first subframe in the subframe set n−2 is . . . 01, and an SFN of a first subframe in subframes in the subframe set n−1 is . . . 10. As illustrated in FIG. 3, the second information may indicate that the subframe a corresponds to the SFN . . . 01 and the subframe b corresponds to the SFN . . . 10. That is, the subframe a is configured for transmission of uplink information corresponding to the subframe set with the SFN . . . 01, and the subframe b is configured for transmission of uplink information corresponding to the subframe set with the SFN . . . 10, wherein a range of the SFN of the subframe may be 0~1,023, and correspondingly, the SFN may be indicated by 10 bits.

Optionally, for reducing a signaling overhead, the network equipment may indicate an SFN of a first subframe in a certain previous time resource set by adopting M bits in the second information, M being an integer more than or equal to 2. For example, the second information contains last M bits or M bits at other locations of the SFN, which will not be limited in the embodiments of the disclosure.

Figure 4:
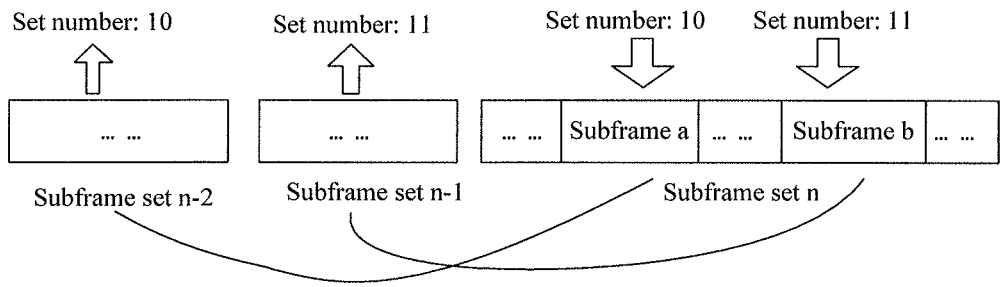
FIG. 4 is another example of a method for transmitting uplink information on an unlicensed carrier according to an embodiment of the disclosure.

As illustrated in FIG. 4, the second information indicates a set number of the previous time resource set by adopting 2 bits. Specifically, a set number of the subframe set n−2 is 10, a set number of the subframe set n−1 is 11, and then the second information may indicate that the subframe a corresponds to the set number 10 and the subframe b corresponds to the set number 11.

If a specific time resource in the at least one previous time resource set is not indicated in the second information, the terminal equipment may send uplink information corresponding to all time resources or all downlink time resources or all downlink time resources that have received downlink information in each of the at least one previous time resource set on the first time resource as a default. Optionally, the second information may further include time resource number information of a time resource corresponding to the first time resource in a certain previous time resource set. For example, the second information may further include subframe number information of at least one target subframe corresponding to the first time resource in the previous time resource set, wherein a value of the subframe number may be 0-9. Optionally, the second information may include 4 bits for indicating the subframe number of the subframe corresponding to the first time resource, or 10 subframes in a radio frame may be divided into L groups in advance, wherein 9, and a number of the group the subframe corresponding to the first time resource is indicated in the second information by adopting $\lceil \log_2 L \rceil$ bits.

Figure 5:
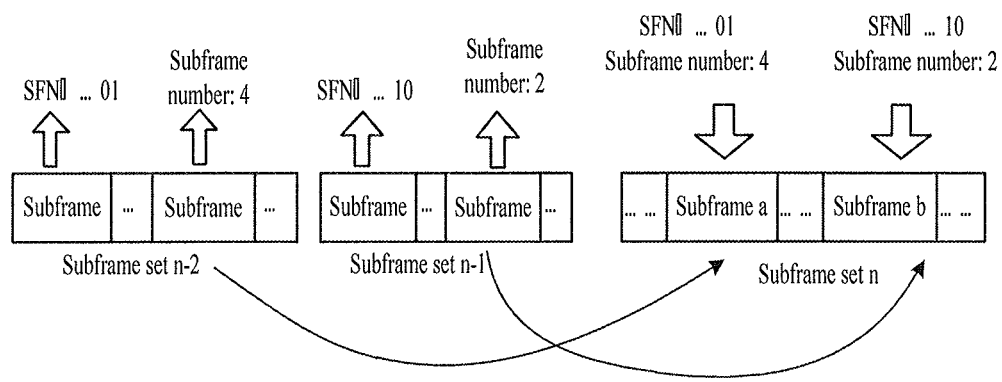
FIG. 5 is another example of a method for transmitting uplink information on an unlicensed carrier according to an embodiment of the disclosure.

As illustrated in FIG. 5, the subframe a corresponds to a subframe 4 in the subframe set n−2, and the subframe b corresponds to a subframe 2 in the subframe set n−1. Then, the second information may specifically indicate that the subframe a corresponds to a subframe with SFN information of 01 and a subframe number of 4, and the subframe b corresponds to a subframe with SFN information of 10 and a subframe number of 2, which, however, will not form any limit to the embodiments of the disclosure.

It should be noted that the example of FIG. 3 to FIG. 5 is intended not to limit the scope of the embodiment of the disclosure but to help those skilled in the art better understood the embodiments of the disclosure. Those skilled in the art may obviously make various equivalent modifications or variations according to the given example of FIG. 3 to FIG. 5, and such modifications or variations also fall within the scope of the embodiment of the disclosure.

As another alternative embodiment, the second information is further configured to indicate a number of subframes and/or a number of downlink subframes in the at least one previous time resource set, which, however, will not form any limit to the embodiments of the disclosure.

As another alternative embodiment, the terminal equipment may determine the corresponding relationship between the first time resource and the at least one previous time resource set according to the third information. Optionally, the third information may further be configured to indicate the present time resource set or indicate the first time resource in the present time resource set. For example, the third information may include the set number information of the present time resource set or may further include a location of the first time resource in the present time resource set. As a specific example, the network equipment sends DCI to the terminal equipment in a time resource set L obtained by contention, the DCI being configured to schedule the PUSCH of the terminal equipment and indicate the PUSCH to be transmitted in a time resource set L+M obtained by contention, M being an integer more than or equal to 1. However, this will not form any limit to the embodiments of the disclosure.

It should be understood that the first information, the second information, the third information and the fourth information may be contained in different messages or part of the information may be contained in the same message. For example, the first information or the fourth information may be contained with the second information in the same message, or the first information and the third information may be contained in the same message, which will not be limited in the embodiments of the disclosure.

Therefore, according to the method for transmitting the uplink information on the unlicensed carrier in the embodiments of the disclosure, the network equipment contends for transmission resources on the unlicensed carrier, and the terminal equipment transmits the uplink information in the present time resource set, obtained by the network equipment by contention, of the unlicensed carrier. The uplink information corresponds to the downlink information transmitted by the network equipment in the at least one previous time resource set, and the terminal equipment is not required to contend for the transmission resources on the unlicensed carrier. In addition, the network equipment may configure all terminal equipment to adopt the same uplink and downlink subframe correspondence, and is not required to determine an uplink and downlink correspondence according to a respective condition of each piece of terminal equipment, so that complexity of the network equipment is reduced, and system performance is improved.

In the embodiment of the disclosure, the terminal equipment may send the uplink information on the first time resource. Optionally, the first time resource may correspond to one or more time resource units, for example, one or more subframes, and the uplink information may correspond to the downlink information in one previous time resource set, or may correspond to the downlink information in each of multiple previous time resource sets, and may specifically correspond to the downlink information in one or more time resource units in each previous time resource set. That is, in the embodiment of the disclosure, the terminal equipment may send the uplink information corresponding to the downlink information in one or more other time resource units on one time resource unit. For example, an ACK/NACK corresponding to a PDSCH in one or more other subframes is fed back in one subframe. However, this will not form any limit to the embodiments of the disclosure.

Optionally, the terminal equipment may transmit feedback information on a PUCCH or a PUSCH, and the feedback information may specifically be an ACK/NACK. If the terminal equipment transmits the ACK/NACK on the PUCCH, the terminal equipment may optionally transmit the ACK/NACK in PUCCH format 3 or PUCCH format 4 or PUCCH format 5 or another format, which, however, will not form any limit to the embodiments of the disclosure.

The terminal equipment may transmit an N-bit ACK/NACK in the first time resource. N may be a number of all time resource units or a number of all downlink time resource units included in the at least one previous time resource set, and in this case, the terminal equipment may fill a time resource unit receiving no PDSCH with 0 or 1; or, N may also be a number of time resource units of PDSCHs received by the terminal equipment and sent by the network equipment in the at least one previous time resource set, or may further be a numerical value configured by the network equipment. However, this will not form any limit to the embodiments of the disclosure.

As an alternative embodiment, N is determined by the following formula:

$$N = \sum_{i=0}^{K-1} C \cdot X_i, \quad (1)$$

where K represents a number of the at least one previous time resource set, C represents a maximum bit number of the ACK/NACK corresponding to each PDSCH, $X_i$ is equal to a number of time resource units included in an ith previous time resource set of the at least one previous time resource set or equal to a number of downlink time resource units included in the ith previous time resource set or equal to a parameter value configured for the ith previous time resource set by the network equipment, and the parameter value may not be greater than the number of the time resource units included in the ith previous time resource set.

As another alternative embodiment, N is determined by the following formula:

$$N = \sum_{i=0}^{K-1} Y_i, \quad (2)$$

where K represents the number of the at least one previous time resource set, $Y_i$ is equal to the parameter value configured for the ith previous time resource set of the at least one previous time resource set by the network equipment, and the parameter value is an integer more than or equal to 0.

In the embodiment of the disclosure, if multiple pieces of terminal equipment correspond to the same uplink and downlink subframe correspondence (or called as a HARQ time sequence relationship), there may occur the condition that at least one two pieces of terminal equipment send uplink information to the network equipment on a same time resource of the unlicensed carrier. In this case, the at least two pieces of terminal equipment may transmit the uplink information by adopting different resources (for example, frequency resources, code resources and the like) on the same first time resource. Optionally, resources corresponding to different terminal equipment may be predefined and may also be configured by the network equipment, which will not be limited in the embodiments of the disclosure.

As another alternative embodiment, the method 200 further includes the following operations.

The network equipment sends fifth information, the fifth information being configured to indicate resource number information corresponding to the terminal equipment on the first time resource.

The fifth indication information may be sent in the unicast, multicast or broadcast form. For example, the network equipment may broadcast the fifth information, the fifth information being configured to indicate resource number information corresponding to each piece of terminal equipment in multiple pieces of terminal equipment on the first time resource. In this case, the terminal equipment may send the uplink information to the network equipment on the first time resource by adopting transmission resources indicated by the fifth information.

It should be understood that the embodiment is described with the condition that the uplink information includes the ACK/NACK and/or the PUSCH as an example, and optionally, the uplink information may further include a scheduling request and/or CSI. However, this will not form any limit to the embodiments of the disclosure.

It should also be understood that a serial number of each process does not mean the execution order, and the execution order of each process should be determined according to its function and an internal logic, which should not form any limit to an implementation process of the embodiments of the disclosure.

The method for transmitting the uplink information on the unlicensed carrier according to the embodiments of the disclosure has been described above in combination with FIG. 1 to FIG. 5 in detail, and a device for transmitting the uplink information on the unlicensed carrier according to the embodiments of the disclosure will be described below in combination with FIG. 6 to FIG. 9.

Figure 6:
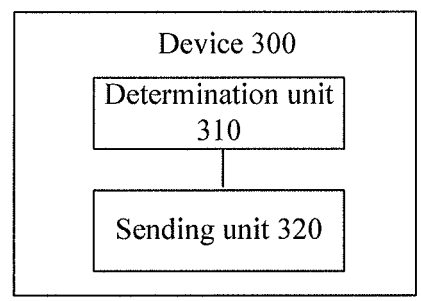
FIG. 6 is a schematic block diagram of a device for transmitting uplink information on an unlicensed carrier according to an embodiment of the disclosure.

FIG. 6 illustrates a device 300 for transmitting uplink information on an unlicensed carrier according to an embodiment of the disclosure. The device 300 includes the following units.

A determination unit 310 is configured to determine a present time resource set configured for data transmission of network equipment on the unlicensed carrier, wherein the network equipment performs data transmission on the unlicensed carrier through time resource sets obtained by contention, time resources in each time resource set obtained by contention are continuously distributed, and the time resources in different time resource sets are distributed at intervals.

A sending unit 320 is configured to send the uplink information to the network equipment on a first time resource in the present time resource set determined by the determination unit 310, the uplink information corresponding to downlink information transmitted by the network equipment in at least one previous time resource set.

Specifically, the time resource sets obtained by the network equipment by contention include the present time resource set and the at least one previous time resource set, and any time resource in the at least one previous time resource set is located before any time resource in the present time resource set.

Optionally, the downlink information includes DCI, and the uplink information includes a PUSCH.

Optionally, as another embodiment, the downlink information includes a PDSCH, and the uplink information includes an ACK/NACK.

As another alternative embodiment, the device 300 further includes: a first receiving unit, configured to receive first information sent by the network equipment.

Correspondingly, the determination unit 310 is specifically configured to determine a set number of the present time resource set obtained by the network equipment by contention according to the first information received by the first receiving unit.

As an alternative embodiment, the first information includes number information of a system frame where a starting time resource in the present time resource set is located, or the first information includes set number information of the present time resource set.

As an alternative embodiment, the device 300 further includes: a second receiving unit, configured to, before the sending unit 320 sends the uplink information to the network equipment on the first time resource in the present time resource set determined by the determination unit 310, receive second information sent by the network equipment in the present time resource set, the second information indicating that the first time resource or the present time resource set is configured for transmission of the uplink information corresponding to the downlink information transmitted by the network equipment in the at least one previous time resource set.

As another alternative embodiment, the device 300 further includes: a second receiving unit, configured to, before the sending unit 320 sends the uplink information to the network equipment on the first time resource in the present time resource set determined by the determination unit 310, receive third information sent by the network equipment in the at least one previous time resource set, the third information indicating that the uplink information corresponding to the downlink information transmitted by the network equipment in the at least one previous time resource set is transmitted in the present time resource set or the first time resource.

As another alternative embodiment, the determination unit 310 is further configured to, before the sending unit 320 sends the uplink information to the network equipment on the first time resource in the present time resource set determined by the determination unit, determine according to a preset rule that the present time resource set or the first time resource is configured for transmission of the uplink information corresponding to the downlink information transmitted by the network equipment in the at least one previous time resource set.

As an alternative embodiment, the third information includes set number information of the present time resource set.

As an alternative embodiment, the second information includes set number information of each of the at least one previous time resource set.

As another alternative embodiment, the second information further includes time resource number information of at least one target time resource unit in the at least one previous time resource set, wherein the first time resource is configured for transmission of the uplink information corresponding to the downlink information transmitted by the network equipment on the at least one target time resource unit.

As another alternative embodiment, the determination unit 310 is further configured to, before the sending unit 320 sends the uplink information to the network equipment on the first time resource in the present time resource set, determine the first time resource in the present time resource set according to a preset rule.

As another alternative embodiment, the device 300 further includes: a third receiving unit, configured to, before the sending unit 320 sends the uplink information to the network equipment on the first time resource in the present time resource set, receive fourth information sent by the network equipment in the present time resource set, the fourth information being configured to indicate the first time resource.

As another alternative embodiment, the downlink information includes the PDSCH, and the uplink information includes the ACK/NACK. In this case, the sending unit 320 is specifically configured to send an N-bit ACK/NACK to the network equipment through a PUCCH or PUSCH on the first time resource, the N-bit ACK/NACK being configured to indicate whether the terminal equipment successfully receives the PDSCH sent by the network equipment in the at least one previous time resource set.

It should be understood that the device 300 is embodied in form of a functional unit. Here, the term "unit" may refer to an Application Specific Integrated Circuit (ASIC), an electronic circuit, a processor (for example, a shared processor, a dedicated processor or a group processor) configured to execute one or more software or firmware programs, a memory, a merged logic circuit and/or another proper components supporting a described function. In an alternative example, those skilled in the art should know that the device 300 may specifically be the terminal equipment in the abovementioned embodiments and the device 300 may be configured to execute each flow and/or step corresponding to the terminal equipment in the abovementioned method embodiments, which, for avoiding repetitions, will not be elaborated herein.

Figure 7:
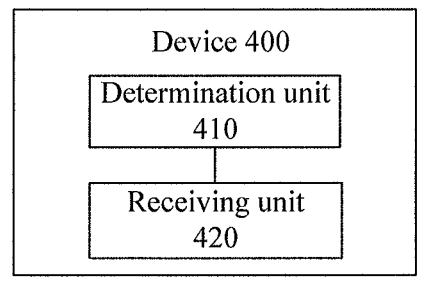
FIG. 7 is a schematic block diagram of another device for transmitting uplink information on an unlicensed carrier according to an embodiment of the disclosure.

FIG. 7 illustrates another device 400 for transmitting uplink information on an unlicensed carrier according to an embodiment of the disclosure. The device 400 includes the following units.

A determination unit 410 is configured to determine a present time resource set for data transmission on the unlicensed carrier, wherein network equipment performs data transmission on the unlicensed carrier through time resource sets obtained by contention, time resources in each time resource set are continuously distributed, and the time resources in different time resource sets are distributed at intervals.

A receiving unit 420 is configured to receive the uplink information sent by terminal equipment on a first time resource in the present time resource set determined by the determination unit 410, the uplink information corresponding to downlink information transmitted by the network equipment in at least one previous time resource set.

Specifically, the time resource sets obtained by the network equipment by contention include the present time resource set and the at least one previous time resource set, and any time resource in the at least one previous time resource set is located before any time resource in the present time resource set.

As an alternative example, the downlink information includes DCI, and the uplink information includes a PUSCH.

As another alternative embodiment, the downlink information includes a PDSCH, and the uplink information includes an ACK/NACK.

As another alternative embodiment, the device 400 further includes the following units.

A first sending unit is configured to send first information before the receiving unit 420 receives the uplink information sent by the terminal equipment on the first time resource in the present time resource set, the first information being configured to indicate a set number of the present time resource set.

As an alternative embodiment, the first information includes number information of a system frame where a starting time resource in the present time resource set is located, or the first information includes set number information of the present time resource set.

As an alternative embodiment, the device 400 further includes: a second sending unit, configured to, before the receiving unit 420 receives the uplink information send by the terminal equipment on the first time resource in the present time resource set, send second information in the present time resource set, the second information indicating that the first time resource or the present time resource set is configured for transmission of the uplink information corresponding to the downlink information transmitted by the network equipment in the at least one previous time resource set.

As another alternative embodiment, the device 400 further includes: a second sending unit, configured to, before the receiving unit 420 receives the uplink information sent by the terminal equipment on the first time resource in the present time resource set, send third information sent in the previous time resource set, the third information indicating that the uplink information corresponding to the downlink information transmitted by the network equipment in the at least one previous time resource set is transmitted in the present time resource set or the first time resource.

As another alternative embodiment, the determination unit 410 is further configured to determine according to a preset rule that the present time resource set or the first time resource is configured for transmission of the uplink information corresponding to the downlink information transmitted in the at least one previous time resource set.

As an alternative embodiment, the third information includes set number information of the present time resource set.

As an alternative embodiment, the second information includes set number information of each of the at least one previous time resource set.

As another alternative embodiment, the second information further includes time resource number information of at least one target time resource unit in the at least one previous time resource set, wherein the first time resource is configured for transmission of the uplink information corresponding to the downlink information transmitted by the network equipment on the at least one target time resource unit.

As another alternative embodiment, the device 400 further includes: a third sending unit, configured to, before the receiving unit 420 receives the uplink information sent by the terminal equipment on the first time resource in the present time resource set, send fourth information in the present time resource set, the fourth information being configured to indicate the first time resource.

As another alternative embodiment, the downlink information includes the PDSCH, and the uplink information includes the ACK/NACK. In this case, the receiving unit 420 is specifically configured to receive an N-bit ACK/NACK transmitted by the terminal equipment through a PUCCH or PUSCH on the first time resource, the N-bit ACK/NACK being configured to indicate whether the terminal equipment successfully receives the PDSCH sent by the network equipment in the at least one previous time resource set.

It should be understood that the device 400 is embodied in form of a functional unit. Here, the term "unit" may refer to an ASIC, an electronic circuit, a processor (for example, a shared processor, a dedicated processor or a group processor) configured to execute one or more software or firmware programs, a memory, a merged logic circuit and/or another proper components supporting a described function. In an alternative example, those skilled in the art should know that the device 300 may specifically be the terminal equipment in the abovementioned embodiments, and the device 400 may be configured to execute each flow and/or step corresponding to the network equipment in the abovementioned method embodiments, which, for avoiding repetitions, will not be elaborated herein.

Figure 8:
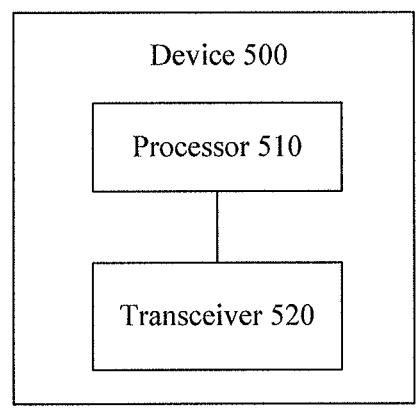
FIG. 8 is a schematic block diagram of another device for transmitting uplink information on an unlicensed carrier according to an embodiment of the disclosure.

FIG. 8 illustrates another device 500 for transmitting uplink information on an unlicensed carrier according to an embodiment of the disclosure. The device 500 includes the following components.

A processor 510 is configured to determine a present time resource set configured for data transmission of network equipment on the unlicensed carrier, wherein the network equipment performs data transmission on the unlicensed carrier through time resource sets obtained by contention, time resources included in each time resource set are continuously distributed, and the time resources in different time resource sets are distributed at intervals; and A transceiver 520 is configured to send the uplink information to the network equipment on a first time resource in the present time resource set determined by the processor 510, the uplink information corresponding to downlink information transmitted by the network equipment in at least one previous time resource set.

Specifically, the time resource sets obtained by the network equipment by contention include the present time resource set and the at least one previous time resource set, and any time resource in the at least one previous time resource set is located before any time resource in the present time resource set.

It should be understood that the device 500 may specifically be the terminal equipment in the abovementioned embodiments and may be configured to execute each flow and/or step corresponding to the terminal equipment in the abovementioned method embodiments. Optionally, the device 500 may further include a memory, and the memory may include a Read-Only Memory (ROM) and a Random Access Memory (RAM), and provides instructions and data for the processor. Part of the memory may further include a nonvolatile random access memory. For example, the memory may further store information of an equipment type. The processor may be configured to execute the instructions stored in the memory, and when the processor executes the instructions stored in the memory, the processor is configured to execute each step and/or flow of the abovementioned method embodiments. Optionally, the device 500 may further include a bus, and the processor, the transceiver and the memory may be connected through the bus.

Figure 9:
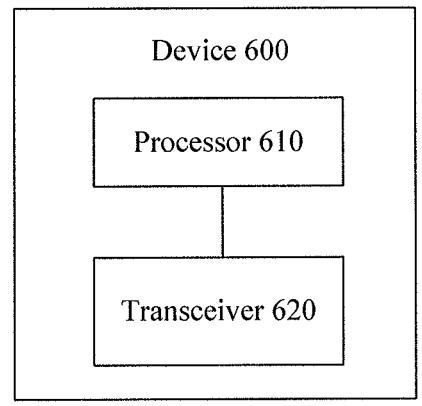
FIG. 9 is a schematic block diagram of another device for transmitting uplink information on an unlicensed carrier according to an embodiment of the disclosure.

FIG. 9 illustrates another device 600 for transmitting uplink information on an unlicensed carrier according to an embodiment of the disclosure. The device 600 includes the following components.

A processor 610 is configured to determine a present time resource set for data transmission on the unlicensed carrier, wherein network equipment performs data transmission on the unlicensed carrier through time resource sets obtained by contention, time resources included in each time resource set are continuously distributed, and the time resources in different time resource sets are distributed at intervals.

A transceiver 620 is configured to receive the uplink information sent by terminal equipment on a first time resource in the present time resource set determined by the processor 610, the uplink information corresponding to downlink information transmitted by the network equipment in at least one previous time resource set.

Specifically, the time resource sets obtained by the network equipment by contention include the present time resource set and the at least one previous time resource set, and any time resource in the at least one previous time resource set is located before any time resource in the present time resource set.

It should be understood that the device 600 may specifically be the network equipment in the abovementioned embodiments and may be configured to execute each flow and/or step corresponding to the network equipment in the abovementioned method embodiments. Optionally, the device 600 may further include a memory, and the memory may include a ROM and a RAM, and provides instructions and data for the processor. Part of the memory may further include a nonvolatile random access memory. For example, the memory may further store information of an equipment type. The processor may be configured to execute the instructions stored in the memory, and when the processor executes the instructions stored in the memory, the processor is configured to execute each step and/or flow of the abovementioned method embodiments. Optionally, the device 600 may further include a bus, and the processor, the transceiver and the memory may be connected through the bus.

It should be understood that, in the embodiments of the disclosure, the processor may be a Central Processing Unit (CPU), and the processor may also be another universal processor, a Digital Signal Processor (DSP), an ASIC, a Field-Programmable Gate Array (FPGA) or another programmable logic device, discrete gate or transistor logical device, discrete hardware component and the like. The universal processor may be a microprocessor or the processor may also be any conventional processor and the like.

In an implementation process, each operation of the method may be implemented by an integrated logic circuit of hardware in the processor or instructions in a software form. The operations of the method disclosed in combination with the embodiments of the disclosure may be directly embodied to be executed and implemented by a hardware processor or executed and implemented by combining hardware and software modules in the processor. The software module may be located in a mature storage medium in this field such as a RAM, a flash memory, a ROM, a programmable ROM or electrically erasable programmable ROM and a register. The storage medium is located in the memory, and the processor executes the instructions in the memory and completes the operations of the method in combination with hardware. For avoiding repetitions, no more detailed descriptions will be made herein.

Those of ordinary skilled in the art may realize that each method step and unit described in combination with the embodiments disclosed in the disclosure may be implemented by electronic hardware, computer software or a combination of the two. For clearly describing interchangeability of hardware and software, the operations and composition of each embodiment have generally been described in the specification according to functions, and whether these functions are executed in a hardware or software manner depends on specific applications and design constraints of the technical solutions. Those of ordinary skilled in the art may realize the described functions for each specific application by virtue of different methods, and such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in each embodiment of the disclosure may be integrated into a processing unit, each unit may also exist independently, and two or more than two unit may also be integrated into a unit. The integrated unit may be implemented in form of hardware, and may also be implemented in form of software function unit.

When being implemented in form of software function unit and sold or used as an independent product, the integrated unit may also be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting uplink information on an unlicensed carrier, comprising:
   determining, by terminal equipment, a present time resource set for data transmission of network equipment on the unlicensed carrier, wherein the network equipment performs data transmission on the unlicensed carrier through time resource sets obtained by contention, time resources in each time resource set obtained by contention are continuously distributed, and time resources in different time resource sets are distributed at intervals; and
   sending, by the terminal equipment, the uplink information to the network equipment in a first time resource of the present time resource set on the unlicensed carrier, the uplink information corresponding to downlink information transmitted by the network equipment in at least one previous time resource set of the present time resource set, wherein the downlink information comprises a Physical Downlink Shared Channel (PDSCH), and the uplink information comprises an Acknowledgement (ACK)/Non-Acknowledgement (NACK), and
   wherein before sending, by the terminal equipment, the uplink information to the network equipment in the first time resource of the present time resource set on the unlicensed carrier, the method further comprises:
   receiving, by the terminal equipment, fourth information sent by the network equipment in the present time resource set, the fourth information being configured to indicate the first time resource; and
   wherein sending, by the terminal equipment, the uplink information to the network equipment in the first time resource of the present time resource set on the unlicensed carrier comprises:
   sending, by the terminal equipment, an N-bit ACK/NACK to the network equipment through a Physical Uplink Control Channel (PUCCH) or Physical Uplink Shared Channel (PUSCH) on the first time resource, the N-bit ACK/NACK being configured to indicate whether the terminal equipment successfully receives the PDSCH sent by the network equipment in the at least one previous time resource set, and N being a positive integer, and wherein N is determined by the following formula:

$$N = \sum_{i=0}^{K-1} C \cdot X_i,$$

where K represents a number of the at least one previous time resource set, C represents a maximum bit number of ACK/NACK corresponding to each PDSCH, $X_i$ is equal to a number of time resource units in an ith previous time resource set of the at least one previous time resource set or equal to a number of downlink time resource units in the ith previous time resource set or equal to a parameter value configured for the ith previous time resource set by the network equipment, the parameter value being not greater than the number of the time resource units in the ith previous time resource set.

2. The method according to claim 1, wherein determining, by the terminal equipment, the present time resource set for data transmission of the network equipment on the unlicensed carrier comprises:
   receiving, by the terminal equipment, first information sent by the network equipment; and
   determining, by the terminal equipment, a set number of the present time resource set obtained by the network equipment by contention according to the first information.

3. The method according to claim 2, wherein the first information comprises System Frame Number (SFN) information of a system frame where a starting time resource in the present time resource set is located, or
   the first information comprises set number information of the present time resource set.

4. The method according to claim 1, wherein sending, by the terminal equipment, the N-bit ACK/NACK to the network equipment through the PUCCH or PUSCH on the first time resource comprises:
   sending, by the terminal equipment, the N-bit ACK/NACK to the network equipment on the first time resource by adopting PUCCH format 3 or PUCCH format 4 or PUCCH format 5.

5. The method according to claim 1, before sending, by the terminal equipment, the uplink information to the network equipment in the first time resource of the present time resource set on the unlicensed carrier, further comprising:
   receiving, by the terminal equipment, second information sent by the network equipment in the present time resource set, the second information indicating that the first time resource is configured for transmission of the uplink information corresponding to the downlink information transmitted by the network equipment in the at least one previous time resource set.

6. The method according to claim 5, wherein the second information comprises set number information of each of the at least one previous time resource set.

7. The method according to claim 6, wherein the second information further comprises time resource number information of at least one target time resource unit in the at least one previous time resource set, wherein the first time resource is configured for transmission of the uplink information corresponding to the downlink information transmitted by the network equipment on the at least one target time resource unit.

8. A method for transmitting uplink information on an unlicensed carrier, comprising:
  determining, by network equipment, a present time resource set for data transmission on the unlicensed carrier, wherein the network equipment performs data transmission on the unlicensed carrier through time resource sets obtained by contention, time resources in each time resource set obtained by contention are continuously distributed, and time resources in different time resource sets are distributed at intervals; and
  receiving, by the network equipment, the uplink information sent by terminal equipment in a first time resource of the present time resource set on the unlicensed carrier, the uplink information corresponding to downlink information transmitted by the network equipment in at least one previous time resource set of the present time resource set, wherein the downlink information comprises a Physical Downlink Shared Channel (PDSCH), and the uplink information comprises an Acknowledgement (ACK)/Non-Acknowledgement (NACK), and
  wherein before receiving, by the network equipment, the uplink information sent by the terminal equipment in the first time resource of the present time resource set on the unlicensed carrier, the method further comprises:
  sending, by the network equipment, fourth information in the present time resource set, the fourth information being configured to indicate the first time resource; and
  wherein receiving, by the network equipment, the uplink information sent by the terminal equipment in the first time resource of the present time resource set on the unlicensed carrier comprises:
  receiving, by the network equipment, an N-bit ACK/NACK transmitted by the terminal equipment through a Physical Uplink Control Channel (PUCCH) or Physical Uplink Shared Channel (PUSCH) on the first time resource, the N-bit ACK/NACK being configured to indicate whether the terminal equipment successfully receives the PDSCH sent by the network equipment in the at least one previous time resource set, and N being a positive integer, and wherein N is determined by the following formula:

$$N = \sum_{i=0}^{K-1} C \cdot X_i,$$

where K represents a number of the at least one previous time resource set, C represents a maximum bit number of ACK/NACK corresponding to each PDSCH, $X_i$ is to a number of time resource units in an ith previous time resource set of the at least one previous time resource set or equal to a number of downlink time resource units in the ith previous time resource set or equal to a parameter value configured for the ith previous time resource set by the network equipment, the parameter value being not greater than the number of the time resource units in the ith previous time resource set.

9. The method according to claim 8, before receiving, by the network equipment, the uplink information sent by the terminal equipment in the first time resource of the present time resource set on the unlicensed carrier, further comprising:
  sending, by the network equipment, first information, the first information being configured to indicate a set number of the present time resource set.

10. The method according to claim 8, before receiving, by the network equipment, the uplink information sent by the terminal equipment in the first time resource of the present time resource set on the unlicensed carrier, further comprising:
  sending, by the network equipment, second information in the present time resource set, the second information indicating that the first time resource is configured for transmission of the uplink information corresponding to the downlink information transmitted by the network equipment in the at least one previous time resource set.

11. The method according to claim 10, wherein the second information comprises set number information of each of the at least one previous time resource set.

12. The method according to claim 11, wherein the second information further comprises time resource number information of at least one target time resource unit in the at least one previous time resource set, wherein the first time resource is configured for transmission of the uplink information corresponding to the downlink information transmitted by the network equipment on the at least one target time resource unit.

13. A device for transmitting uplink information on an unlicensed carrier, comprising: a memory, a processor, and a computer program stored on the memory and capable of running on the processor, wherein the computer program, when executed by the processor, cause the processor to execute operations comprising:
  determining a present time resource set for data transmission of network equipment on the unlicensed carrier, wherein the network equipment performs data transmission on the unlicensed carrier through time resource sets obtained by contention, time resources in each time resource set obtained by contention are continuously distributed, time resources in different time resource sets are distributed at intervals, and the time resource sets obtained by the network equipment by contention comprise the present time resource set; and
  sending the uplink information to the network equipment on a first time resource in the present time resource set, the uplink information corresponding to downlink information transmitted by the network equipment in at least one previous time resource set of the present time resource set, wherein the downlink information comprises a Physical Downlink Shared Channel (PDSCH), and the uplink information comprises an Acknowledgement (ACK)/Non-Acknowledgement (NACK),
  the processor executes further operations comprising:
  before sending the uplink information to the network equipment in the first time resource in the present time resource set on the unlicensed carrier, receiving fourth information sent by the network equipment in the present time resource set, the fourth information being configured to indicate the first time resource; and sending an N-bit ACK/NACK to the network equipment through a Physical Uplink Control Channel (PUCCH) or Physical Uplink Shared Channel (PUSCH) on the first time resource, the N-bit ACK/NACK being configured to indicate whether the device successfully receives the PDSCH sent by the network equipment in the at least one previous time resource set, and N being a positive integer, and wherein N is determined by the following formula:

$$N = \sum_{i=0}^{K-1} C \cdot X_i,$$

where K represents a number of the at least one previous time resource set, C represents a maximum bit number of ACK/NACK corresponding to each PDSCH, $X_i$ is equal to a number of time resource units in an ith previous time resource set of the at least one previous time resource set or equal to a number of downlink time resource units in the ith previous time resource set or equal to a parameter value configured for the ith previous time resource set by the network equipment, the parameter value being not greater than the number of the time resource units in the ith previous time resource set.

14. The device according to claim 13, wherein the processor executes further operations comprising:

before sending the uplink information to the network equipment in the first time resource of the present time resource set on the unlicensed carrier, receiving second information sent by the network equipment in the present time resource set, the second information indicating that the first time resource is configured for transmission of the uplink information corresponding to the downlink information transmitted by the network equipment in the at least one previous time resource set.

15. The device according to claim 14, wherein the second information comprises set number information of each of the at least one previous time resource set.

16. The device according to claim 15, wherein the second information further comprises time resource number information of at least one target time resource unit in the at least one previous time resource set, wherein the first time resource is configured for transmission of the uplink information corresponding to the downlink information transmitted by the network equipment on the at least one target time resource unit.

* * * * *